(12) United States Patent
Kim et al.

(10) Patent No.: US 10,301,182 B2
(45) Date of Patent: May 28, 2019

(54) METHOD FOR PRODUCING CHLOROSILANE GAS USING CONTINUOUS TUBULAR REACTOR

(71) Applicant: LG CHEM, LTD., Seoul (KR)

(72) Inventors: Yoo Seok Kim, Daejeon (KR); Jeong Kyu Kim, Daejeon (KR); JinHyoung Yoo, Daejeon (KR); JungWoo Lee, Daejeon (KR); Eunsu Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 153 days.

(21) Appl. No.: 15/310,725

(22) PCT Filed: May 13, 2015

(86) PCT No.: PCT/KR2015/004798
§ 371 (c)(1),
(2) Date: Nov. 11, 2016

(87) PCT Pub. No.: WO2015/174734
PCT Pub. Date: Nov. 19, 2015

(65) Prior Publication Data
US 2017/0113938 A1    Apr. 27, 2017

(30) Foreign Application Priority Data

May 13, 2014 (KR) .................. 10-2014-0057093

(51) Int. Cl.
*C01B 33/107*    (2006.01)
*B01J 19/24*    (2006.01)
(Continued)

(52) U.S. Cl.
CPC ......... *C01B 33/10763* (2013.01); *B01J 8/008* (2013.01); *B01J 8/085* (2013.01);
(Continued)

(58) Field of Classification Search
CPC ................... B01J 19/243; B01F 5/061; B01F 5/0618–5/0619; B01F 2005/0636;
(Continued)

(56) References Cited

U.S. PATENT DOCUMENTS 3,119,704 A * 1/1964 Harrell .................... B28C 5/381
106/682
4,422,773 A * 12/1983 Cassaday .............. B01F 5/0646
366/341
(Continued)

FOREIGN PATENT DOCUMENTS

CN    101489659    7/2009
CN    201517074    6/2010
(Continued)

OTHER PUBLICATIONS

Search Report of corresponding Chinese Appl'n No. 201580024938 dated Mar. 12, 2018.
(Continued)

*Primary Examiner* — Jennifer A Leung
(74) *Attorney, Agent, or Firm* — Dentons US LLP

(57) ABSTRACT

The present invention relates to an apparatus for producing trichlorosilane from tetrachlorosilane in an efficient manner. The apparatus includes an inlet through which reaction raw materials including a metal silicon powder dispersed in liquid tetrachlorosilane enter, a hole through which a gaseous reaction raw material is fed, an outlet through which reaction products including trichlorosilane exit, a tubular reactor in which the reaction raw materials entering through the inlet react with each other during flow, and means for impeding the flow of the fluids to cause collision of the fluids during flow.

9 Claims, 4 Drawing Sheets

(51) Int. Cl.
*B01J 10/00* (2006.01)
*B01J 8/08* (2006.01)
*B01J 19/00* (2006.01)
*B01J 8/00* (2006.01)

(52) U.S. Cl.
CPC .......... *B01J 10/00* (2013.01); *B01J 19/0093* (2013.01); *B01J 19/2415* (2013.01); *C01B 33/1071* (2013.01); *C01B 33/10736* (2013.01); *B01J 2208/0053* (2013.01); *B01J 2208/00176* (2013.01); *B01J 2208/00787* (2013.01); *B01J 2219/0086* (2013.01); *B01J 2219/00792* (2013.01); *B01J 2219/00822* (2013.01); *B01J 2219/00855* (2013.01); *B01J 2219/00867* (2013.01); *B01J 2219/00869* (2013.01); *B01J 2219/00873* (2013.01); *B01J 2219/00889* (2013.01); *B01J 2219/182* (2013.01)

(58) Field of Classification Search
CPC .......... C01B 33/1071; C01B 33/10742; C01B 33/10757–33/10763
USPC .......................................... 366/336, 337, 341
See application file for complete search history.

(56) References Cited

U.S. PATENT DOCUMENTS

| | | | | |
|---|---|---|---|---|
| 4,721,575 | A | * | 1/1988 | Binning ................. B01J 19/243 210/177 |
| 5,758,967 | A | * | 6/1998 | King .................... B01F 5/0618 138/39 |
| 9,295,955 | B2 | | 3/2016 | Ni et al. |
| 2010/0034721 | A1 | * | 2/2010 | Ishii ...................... B01J 19/006 423/342 |
| 2010/0124145 | A1 | * | 5/2010 | Ni ............................ B01F 5/061 366/340 |

FOREIGN PATENT DOCUMENTS

| | | | |
|---|---|---|---|
| EP | 0240340 A2 * | 10/1987 | ............. B01J 3/042 |
| JP | S5673617 | 6/1981 | |
| KR | 1020100121388 B1 | 11/2010 | |
| KR | 1020120013071 A | 2/2012 | |
| KR | 10-1309600 | 9/2013 | |
| KR | 1020130105160 A | 9/2013 | |

OTHER PUBLICATIONS

Office Action of Chinese Patent Office in Appl'n No. 201580024938 dated Nov. 12, 2018.

* cited by examiner

METHOD FOR PRODUCING CHLOROSILANE GAS USING CONTINUOUS TUBULAR REACTOR

This application is a National Stage Entry of International Application No. PCT/KR2015/004798, filed May 13, 2015, and claims the benefit of and priority to Korean Application No. 10-2014-0057093, filed on May 13, 2014, all of which are hereby incorporated by reference in their entirety for all purposes as if fully set forth herein.

BACKGROUND OF THE INVENTION

1. Field of the Invention

The present invention relates to a method for producing a chlorosilane gas, and more specifically to a method for producing trichlorosilane using tetrachlorosilane in a more efficient manner.

2. Description of the Related Art

Trichlorosilane ($SiHCl_3$, TCS) is a compound useful as a raw material for highly pure polycrystalline silicon, also called polysilicon. Trichlorosilane reacts with hydrogen at a temperature as high as at least 1000° C. to deposit polysilicon. The reactions for the deposition of polysilicon are typically represented as follows:

$$4SiHCl_3 \rightarrow Si+3SiCl_4+2H_2 \quad (1)$$

$$SiHCl_3+H_2 \rightarrow Si+3HCl \quad (2)$$

Trichlorosilane used in the reactions for the deposition of polysilicon is generally produced by reacting metal silicon with hydrogen chloride. For example, a method for producing trichlorosilane using a fluidized-bed reactor is disclosed in which metal silicon reacts with hydrogen chloride in the presence of a catalyst containing iron and aluminum, as depicted in Reaction 3:

$$Si+3HCl \rightarrow SiHCl_3+H_2 \quad (3)$$

As a result of the reaction, gaseous products are obtained. Thereafter, the gaseous products are condensed by cooling to −10° C. or less. However, this condensate includes other chlorosilanes as by-products as well as trichlorosilane. The trichlorosilane is separated and collected from the condensate by distillation and is then used as a raw material for the production of polysilicon. Tetrachlorosilane ($SiCl_4$, STC) is also separated by distillation. The tetrachlorosilane is converted to trichlorosilane (TCS), typically by Reaction 4:

$$3SiCl_4+2H_2+Si \rightarrow 4SiHCl_3 \quad (4)$$

The trichlorosilane is reused for the production of polysilicon.

Another method for producing trichlorosilane was proposed (see FIG. 1). According to this method, metal silicon particles having a size of about 100 to about 300 μm, hydrogen chloride, tetrachlorosilane, and hydrogen are fed into a fluidized-bed reactor filled with metal silicon particles, and the reaction of the metal silicon and the hydrogen chloride (Reaction 3) and the reaction of the metal silicon, the tetrachlorosilane, and the hydrogen (Reaction 4) are allowed to proceed simultaneously in the reactor to produce trichlorosilane. As the reactions proceed, the metal silicon particles are gradually reduced in size, which requires the replenishment of fresh metal silicon particles. Since a change in the temperature of the raw materials is monitored to determine when to replenish the fresh metal silicon particles, the reaction temperature is not constant and fluctuates, and as a result, the quality of the product becomes non-uniform depending on the reaction time.

SUMMARY OF THE INVENTION

Therefore, there is a need for a method for more efficient conversion of chlorosilanes, particularly tetrachlorosilane, which are present in gases released during the production of polysilicon based on the reaction of trichlorosilane with hydrogen chloride, to trichlorosilane for reuse.

One aspect of the present invention provides an apparatus for producing trichlorosilane, including an inlet through which reaction raw materials including a metal silicon powder dispersed in liquid tetrachlorosilane enter, a hole through which a gaseous reaction raw material is fed, an outlet through which reaction products including trichlorosilane exit, a tubular reactor in which the reaction raw materials entering through the inlet react with each other during flow, and means for impeding the flow of the fluids to cause collision of the fluids during flow.

In one embodiment of the present invention, the fluid-flow impeding means may be structures protruding from the inner wall of the tubular reactor to a reaction space.

In an alternative embodiment of the present invention, the fluid-flow impeding means may be formed by bending a flow path of the tubular reactor.

According to the present invention, the gaseous reaction raw material may be hydrogen chloride, hydrogen or a mixture thereof.

According to the present invention, the reaction may be carried out in a liquid phase at 300 to 1000° C.

According to a preferred embodiment of the present invention, the metal silicon powder may have an average particle diameter of 10 microns or less.

According to a preferred embodiment of the present invention, the metal silicon and the tetrachlorosilane may be in a weight ratio of 1:20-200.

The tetrachlorosilane may be a by-product in the deposition of polysilicon by the reaction of trichlorosilane with hydrogen.

According to a preferred embodiment of the present invention, the apparatus may further include means for cooling and liquefying the tetrachlorosilane as a by-product in the deposition of polysilicon.

According to a preferred embodiment of the present invention, the apparatus may further include means for separating the reaction product trichlorosilane from the metal silicon remaining after the reaction. However, it is preferred that the metal silicon powder is used up in the reaction and does not remain after the reaction.

The apparatus of the present invention can be efficiently used in a process for continuously producing trichlorosilane.

According to the present invention, tetrachlorosilane as a reactant, in which metal silicon particles are dispersed, reacts with hydrogen chloride in the horizontal tubular reactor to produce trichlorosilane during flow through the reactor. The structures formed on the inner wall of the reactor to impede the flow of the fluids ensure homogenization of the reactants to achieve better contact efficiency, resulting in high productivity of trichlorosilane.

By adjusting the size of the metal silicon particles to 10 microns or less, the contact area between the tetrachlorosilane and the silicon particles increases, resulting in an increase in the number of reactive sites. As a result, the reaction rate increases, which brings about an increase in the productivity of trichlorosilane. The metal silicon particles become smaller in size and may thus be used up after the lapse of a predetermined reaction time.

DETAILED DESCRIPTION OF THE INVENTION

Figure 1:
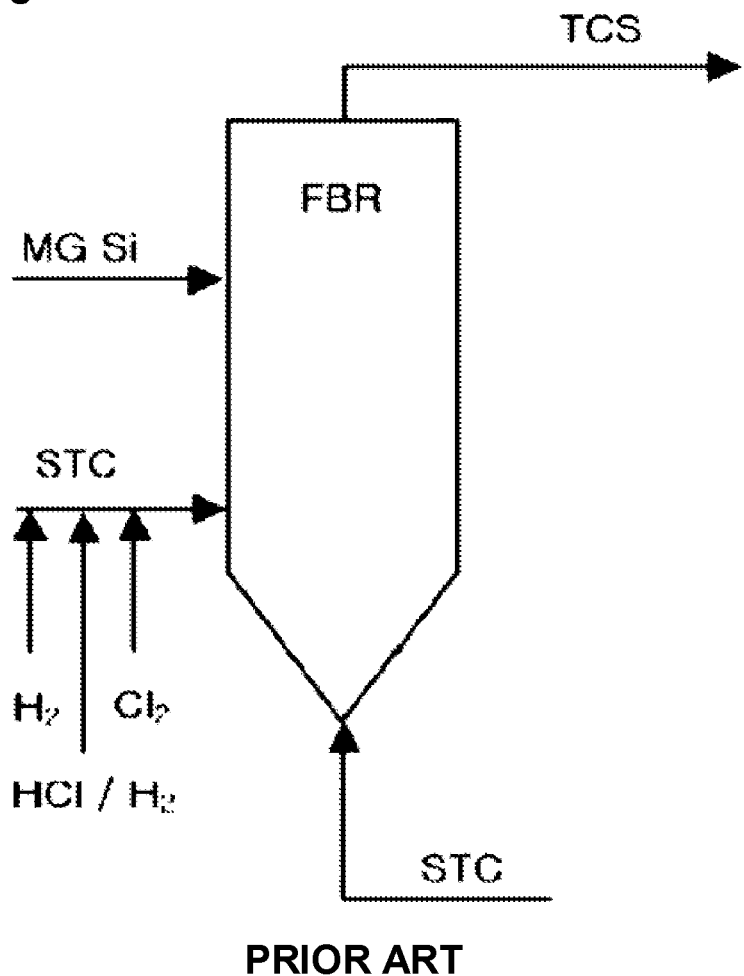
FIG. 1 is a schematic diagram illustrating a fluidized-bed process according to the prior art.

In the apparatus of the present invention, a metal silicon powder is dispersed in and reacts with liquid tetrachlorosilane and hydrogen chloride. This dispersion reaction increases the contact area between the tetrachlorosilane and the silicon and induces uniform contact therebetween to achieve maximum reaction efficiency. Most preferably, the use of the apparatus can ensure sufficient contact time and area so that the metal silicon particles can be used up in the reaction.

The present invention also provides a method for producing trichlorosilane using the apparatus. According to the method of the present invention, the reaction of metal silicon and hydrogen chloride (Reaction 3) and the reaction of tetrachlorosilane, metal silicon, and hydrogen (Reaction 4) occur simultaneously to produce trichlorosilane. The overall reaction is carried out in a liquid phase and can be represented as follows:

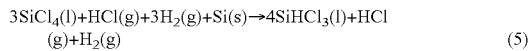

$$3SiCl_4(l)+HCl(g)+3H_2(g)+Si(s) \rightarrow 4SiHCl_3(l)+HCl(g)+H_2(g) \quad (5)$$

The hydrogen chloride is supplied in the gas phase but can participate in the liquid-phase reaction because it is dissolved in the tetrachlorosilane. The reaction products may exist in the liquid phase due to the internal pressure of the reactor immediately after the reaction.

In the method of the present invention, the reactants tetrachlorosilane (STC), hydrogen chloride, hydrogen, and metal silicon powder are simultaneously fed into the tubular reactor at high temperature and pressure and react with each other to produce trichlorosilane (TCS) during flow through a reaction tube of the reactor. Accordingly, it is most preferred that the metal silicon powder is used up in the reaction and does not remain at the outlet of the tubular reactor.

In order for the metal silicon powder to be used up in the reaction, it would be desirable that the tubular reactor is sufficiently long or the metal silicon powder reacts with the other reactants with high efficiency. The tubular reactor can be basically extended to some extent but its length cannot increase to infinity due to physical and cost limitations. In view of these limitations, the present inventors designed the structure of the tubular reactor in which the metal silicon powder can react with the other reactants with improved efficiency.

When a liquid reactant and reactants including metal silicon particles are fed into a tubular reactor having a basic structure ("a linear tubular reactor"), the metal silicon particles are liable to precipitate in a reaction tube of the reactor due to different densities of the liquid reactant and the metal silicon particles. This precipitation increases the risk of non-uniform deposition.

In view of this phenomenon, the apparatus of the present invention includes means for impeding the flow of the fluids in the reaction tube.

The reactants collide with each other and are rearranged by the fluid-flow impeding means during flow through the reaction tube. That is, the fluid-flow impeding means increases the contact frequency, time, and area between the metal silicon particles and the solvent molecules, achieving improved reaction efficiency.

The reaction occurs at high temperature and pressure and is thus greatly affected by the pressure. Although the pressure of the reactor remains constant as a whole, the fluids collide with each other by the impeding means in the tubular reactor to create vortex flows, causing a pressure difference in the local and microscale reaction system. This pressure difference acts as a driving force to improve the efficiency of the reaction.

Figure 2:
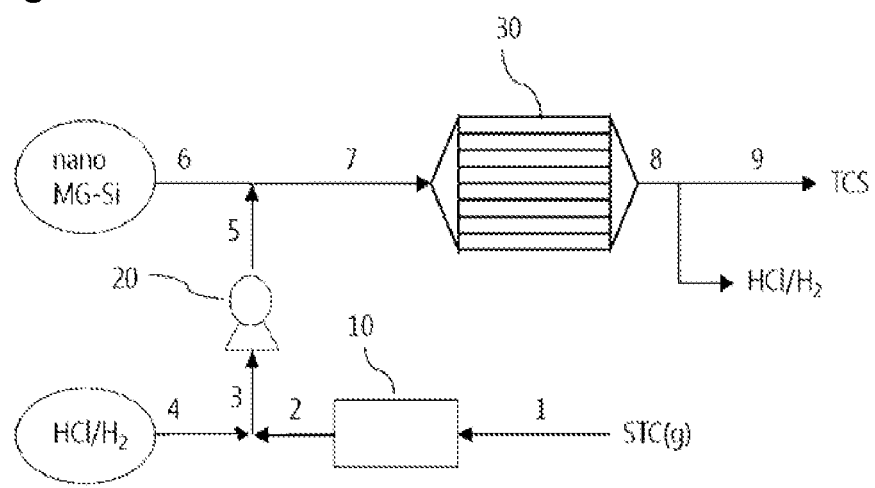
FIG. 2 is a schematic flow diagram illustrating a method for producing trichlorosilane using an apparatus of the present invention.

Referring to FIG. 2, a more detailed explanation will be given of one embodiment of the method according to the present invention.

As illustrated in FIG. 2, tetrachlorosilane gas 1 is converted to liquid tetrachlorosilane during passage through a cooler 10. The liquid tetrachlorosilane 2 is blended with hydrogen chloride 4 and metal silicon particles 6 are added thereto. Before blending with the metal silicon particles, the liquid tetrachlorosilane and the hydrogen chloride may be pressurized by a pump 20. The pump is not necessary but optional.

Hydrogen gas may be added in any of the above-described steps, for example, before or after blending of the liquid tetrachlorosilane 2 with the hydrogen chloride 4 or before or after dispersion of the metal silicon particles.

The dispersion 7 of the metal silicon particles in the liquid tetrachlorosilane/hydrogen chloride blend is fed into a tubular reactor 30 where the reaction occurs. The reactor 30 includes heating means (not shown) for providing an optimum reaction temperature and is designed such that sufficient retention time and contact area can be provided.

It is preferred that the metal silicon particles are used up in the reaction. In this case, a process (for example, a filtering process) for separating the metal silicon particles remaining after the reaction may be omitted.

An effluent 8 from the reactor 30 exists in the form of a liquid due to the internal pressure of the reactor. Trichlorosilane and hydrogen chloride/hydrogen may be separated from the liquid reaction products by distillation under positive or negative pressure. Alternatively, taking advantage of the fact that trichlorosilane is a liquid and hydrogen chloride and hydrogen are gases at room temperature, the trichlorosilane, the hydrogen chloride, and the hydrogen, which exist in liquid states immediately after the reaction, are stored in a state in which the pressure is removed, and as a result, the liquid trichlorosilane can be easily obtained.

FIGS. 3 to 8 schematically illustrate different structures of the tubular reactor according to various embodiments of the present invention.

Figure 3:
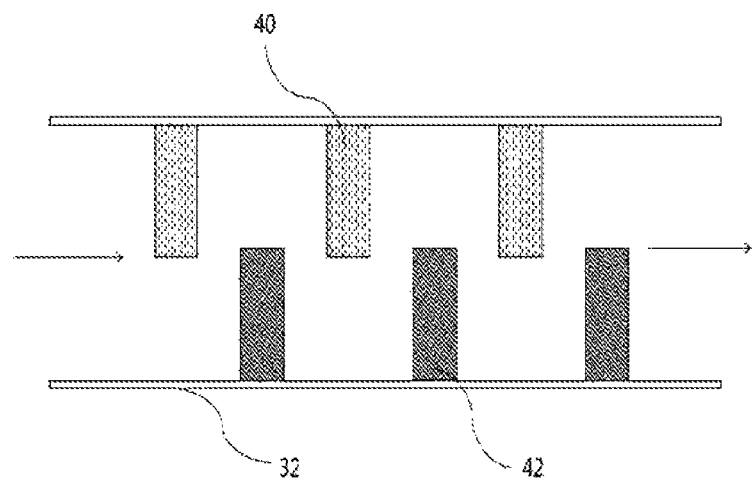
FIG. 3 is a cross-sectional view of an apparatus according to one embodiment of the present invention.

FIG. 3 is a cross-sectional view of the tubular reactor. Referring to FIG. 3, structures 40 and 42 are formed on the inner wall of a reaction tube 32 to impede the flow of fluids. Like baffles, the structures 40 and 42 protrude from the wall of the reaction tube. The reactants flowing in the reaction tube collide with each other to create vortex flows, which increase their contact efficiency. The structures are not limited to a particular shape so long as they can create vortex flows of fluids. Preferably, the structures are shaped such that the metal silicon particles are prevented from depositing thereon.

Figure 4:
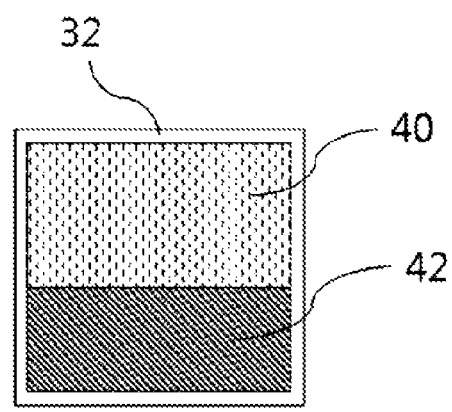
FIGS. 4 and 5 are left side views of apparatuses according to various embodiments of the present invention.
Figure 5:
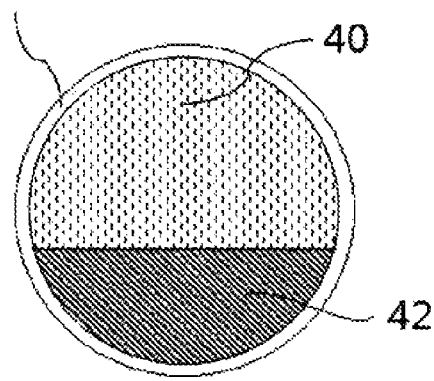

FIG. 4 is a side view of the tubular reactor whose cross-section is rectangular, as viewed from the inlet of the reactor. FIG. 5 is a side view of the tubular reactor whose cross-section is circular, as viewed from the inlet of the reactor. Preferably, each of the fluid-flow impeding structures 40 and 42 opposed to each other extends a distance to the center of the reaction tube. With this arrangement, the fluid-flow impeding structures 40 and 42 prevent the fluids from passing straight through the reactor. As illustrated in the side views of FIGS. 4 and 5, the outlet of each reactor is hidden by the structures 40 and 42.

Figure 6:
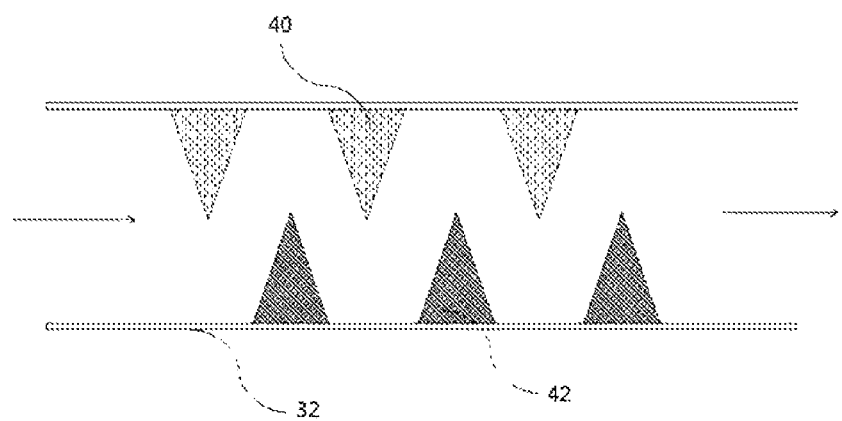
FIG. 6 is a schematic cross-sectional view of an apparatus according to a further embodiment of the present invention.
Figure 7:
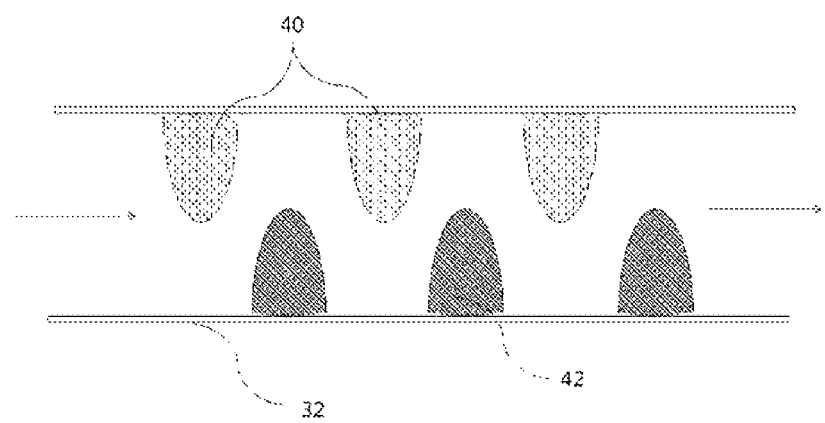
FIG. 7 is a schematic cross-sectional view of an apparatus according to another embodiment of the present invention.

FIGS. 6 and 7 illustrate various cross-sectional shapes of the structures 40 and 42 as fluid-flow impeding means. As explained earlier, the structures are not limited to a particular shape so long as they can create vortex flows of fluids and can minimize the deposition of the metal silicon particles.

Figure 8:
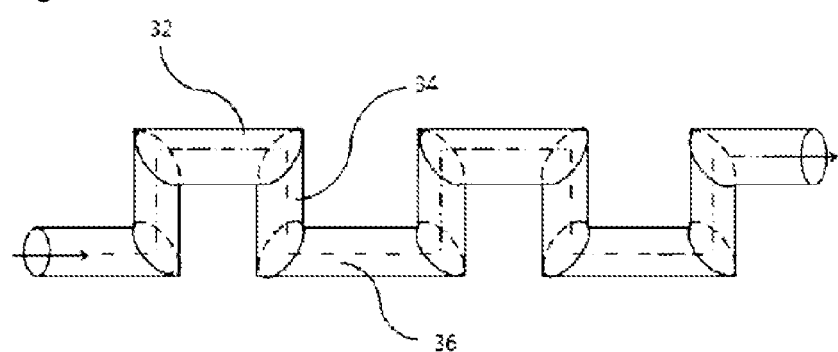
FIG. 8 is a schematic perspective view of an apparatus according to another embodiment of the present invention.

FIG. 8 illustrates another embodiment of the present invention. Referring to FIG. 8, the flow path of the reactor is bent to impede the flow of fluids, unlike the previous figures in which the structures are formed on the inner wall of the reaction tube. In FIG. 8, reaction tubes 32 and 36 parallel to the flow direction of the fluids at the inlet may lie on the same or different planes. In the case where the reaction tubes 32 and 36 parallel to the flow direction of the fluids at the inlet lie on the same plane, reaction tubes 34 perpendicular to the flow direction of the fluids at the inlet also lies on the same plane as the reaction tubes 32 and 36. In this case, the reactor may be a negative type in which the reaction tubes are engraved on a wide plate. In the case where the reaction tubes 32 and 36 parallel to the flow direction of the fluids at the inlet lie on the different planes, reaction tubes 34 perpendicular to the flow direction of the fluids at the inlet may be perpendicular to the plane of the paper.

It is particularly preferred that the reactor used in the apparatus of the present invention is a horizontal type. The horizontal reactor is preferably designed such that the metal silicon power stays until it is used up.

The reaction temperature is appropriately determined taking into consideration various factors (e.g., material and capacity) of the apparatus. If the reaction temperature is higher than is necessary, low selectivity for trichlorosilane and large amounts of chlorosilane by-products (e.g., tetrachlorosilane and dichlorosilane) other than trichlorosilane are obtained. This reaction is exothermic, while the reaction of tetrachlorosilane with hydrogen to produce trichlorosilane in the same reactor is endothermic. Taking the conditions of the two reactions into consideration, the reaction temperature may be appropriately determined. The reaction temperature is typically set in the range of 300 to 1000° C., preferably in the range of 250 to 400° C., but is not limited to this range. The selectivity for trichlorosilane and the reactivity of tetrachlorosilane increase with increasing pressure of the reactor. Appropriate control over the pressure of the reactor is thus required. The pressure is typically set in the range of 5 bar to 100 bar.

Below is a discussion of the individual reactants.

Tetrachlorosilane

The tetrachlorosilane is used without particular limitation in the reaction.

The tetrachlorosilane may be a by-product in the production of polysilicon from trichlorosilane. This ensures effective use of the tetrachlorosilane.

Metal Silicon Powder

The metal silicon used in the reaction is metallurgical silicon or a particulate solid material including silicon element in the form of a metal, such as ferrosilicon or polysilicon. There is no particular restriction on the kinds and contents of impurities (e.g., iron compounds) in the metal silicon. The metal silicon powder is in the form of fine particles that have an average particle diameter of 10 microns or less, preferably 0.5 to 5 microns.

The method of the present invention allows uniform dispersion of the metal silicon particles in the liquid tetrachlorosilane to prevent aggregation and precipitation of the metal silicon particles. The metal silicon particles have a size of 10 microns or less, which is preferred because the contact area with the tetrachlorosilane can be enhanced.

The metal silicon particles and the tetrachlorosilane are preferably mixed in a mass ratio of 1:20-200, more preferably 1:50-150.

The amount of the metal silicon particles added can be suitably selected in a range such that the metal silicon particles dispersed in the tetrachlorosilane are spaced 10 to 1000 nm, preferably 50 to 500 nm, apart from each other.

Preferably, the nanosized metal silicon particles are used up in the reaction, leaving no residue. Thus, a process for separating the residual amount of the fine metal silicon from the products after the reaction can be omitted.

Hydrogen Chloride

The hydrogen chloride reacts with the metal silicon. The kind of impurities in the hydrogen chloride is not particularly limited. For example, hydrogen may be incorporated into the hydrogen chloride. However, since the highly hydrolysable chlorosilanes, such as trichlorosilane, tetrachlorosilane, and dichlorosilane, have a strong tendency to react with water, the presence of water in the hydrogen chloride may increase the risk of low trichlorosilane yield. For this reason, it is preferred that the hydrogen chloride is in a dry state. The hydrogen chloride is dispersed at a molecular level and it can thus be sufficiently distributed around the metal silicon particles dispersed in the liquid reactants, resulting in high reaction efficiency.

The molar ratio of the tetrachlorosilane to the hydrogen chloride is typically from 1:0.1-1, preferably from 1:0.2-0.5. The feeding rate of the hydrogen chloride may be set in an appropriate range depending on the type and size of the reactor used.

Hydrogen

The hydrogen reacts with the tetrachlorosilane to assist in forming trichlorosilane. The hydrogen is available from various industrial sources. For example, hydrogen released during the production of polysilicon may be appropriately purified before use.

The molar ratio of the tetrachlorosilane to the hydrogen is typically from 1:1-5, preferably from 1:1-3. The feeding rate of the hydrogen may be set within an appropriate range depending on the type and size of the reactor used.

Reaction Catalyst

In the method of the present invention, a catalyst may also be used to improve the efficiency of the reaction but its use is not necessarily required.

Any catalyst known as a catalytic component for the reaction between the metal silicon and the hydrogen chloride may be used without limitation. Specific examples of such catalytic components include: Group VIII metal elements, such as iron, cobalt, nickel, palladium, and platinum, and chlorides thereof: and other metals, such as aluminum, copper, and titanium, and chlorides thereof. These catalysts may be used alone or in combination of two or more thereof. The catalytic component may be used in an amount sufficient to improve the production efficiency of trichlorosilane. The amount of the catalytic component used is not particularly limited and may be appropriately determined taking into consideration various factors (e.g., capacity) of the apparatus.

The catalytic component may be directly added to the reaction system.

Alternatively, the catalytic component (e.g., an iron compound) may be present as an impurity in the metal silicon. In this case, the impurity can be effectively used as the catalytic component. Even when the catalytic component is contained as an impurity in the metal silicon, another catalytic component may be further added to the reaction system to increase the reactivity between the metal silicon and the hydrogen chloride without causing any problem.

The present invention will be explained in more detail with reference to the following examples. These examples are provided for illustrative purposes and are not intended to limit the present invention.

EXAMPLES 1 AND 2

5 wt % of metal silicon (purity: 98%, average particle diameter: 3 microns) was dispersed in tetrachlorosilane. The dispersion, hydrogen chloride, and hydrogen were introduced into a micro-tubular reactor at the flow rates shown in Table, and the reaction was allowed to proceed while maintaining a reaction temperature of 350° C. and an internal pressure of 160 bar. The reactor consisted of four SUS316 reaction tubes connected to each other. The internal diameter and length of each reaction tube were 4 mm and 30 mm, respectively. In the reactor, fluid-flow impeding structures were arranged at intervals of 8 mm, as illustrated in FIG. 3. The flow rate of the raw materials through the reactor was adjusted such that the raw materials were discharged within 20 min after feeding.

TABLE 1

| Example No. | Flow rates of raw materials (g/min) | | | | Compositions of products (mole %) | | | Residual metal silicon (g) |
|---|---|---|---|---|---|---|---|---|
| | STC | HCl | $H_2$ | Si | TCS | STC | HCl | |
| 1 | 14.9 | 0.15 | 0.1 | 0.15 | 16 | 47 | 37 | 0.045 |
| 2 | 14.9 | 0.3 | 0.1 | 0.15 | 28 | 38 | 34 | 0.030 |

COMPARATIVE EXAMPLE 1

A vertical reactor (batch type) having an internal diameter of 40 mm and a height of 70 mm was used. The raw materials were fed into the reactor and heated to a reaction temperature of 350° C. with stirring for 10 min. The reaction was allowed to proceed while maintaining the reaction temperature for 20 min. The content of TCS in the resulting products was 5 mole %.

TABLE 2

| Amounts of raw materials (g) | | | | Composition of products (mole %) | | | Residual metal silicon (g) |
|---|---|---|---|---|---|---|---|
| STC | HCl | $H_2$ | Si | TCS | STC | HCl | |
| 29.8 | 0.6 | 0.2 | 0.3 | 5 | 63 | 32 | 0.29 |

As can be seen from the results in Tables 1 and 2, the liquid-phase process using the tubular reactor including the fluid-flow impeding structures (Examples 1-2) was excellent in terms of TCS conversion efficiency compared to the process using the vertical reactor (Comparative Example 1).

INDUSTRIAL APPLICABILITY

According to the present invention, tetrachlorosilane as a reactant, in which metal silicon particles are dispersed, reacts with hydrogen chloride in the horizontal tubular reactor to produce trichlorosilane during flow through the reactor. The structures formed on the inner wall of the reactor to impede the flow of the fluids ensure homogenization of the reactants to achieve better contact efficiency, resulting in high productivity of trichlorosilane.

What is claimed is:

1. A method for continuously producing trichlorosilane, comprising:
   reacting a reaction raw material comprising a metal silicon powder dispersed in liquid tetrachlorosilane, with a gaseous reaction raw material, in an apparatus to yield trichlorosilane during flow of the reaction raw material and the gaseous reaction raw material through the apparatus, wherein the apparatus comprises:
   a tubular reactor that is:
   (a) a horizontally-positioned linear tubular reactor containing structures protruding from an inner wall of the tubular reactor to a reaction space that impede the flow of a fluid through the reactor and that cause collision of the fluid during flow of the fluid through the reactor; or
   (b) composed of parallel tube segments connected by perpendicular tube segments to form a reactor having a circuitous flow path having a square wave shape with a plurality of right angle bends, whereby each bend impedes flow of fluid through the reactor and causes collision of the fluid during flow of the fluid through the reactor;
   an inlet through which a reaction raw material is introduced into the tubular reactor;
   a cooler connected to the inlet;
   a hole through which a gaseous reaction raw material is fed into the tubular reactor; and
   an outlet through which reaction products comprising trichlorosilane exit the tubular reactor.

2. The method of claim 1, wherein the gaseous reaction raw material is introduced through the hole of the tubular reactor and is hydrogen chloride, hydrogen or a mixture thereof.

3. The method of claim 1, wherein the reaction is carried out in a liquid phase.

4. The method of claim 1, wherein the reaction is carried out at a temperature in the range of 300° C. to 1000° C.

5. The method of claim 1, wherein the reaction raw material is introduced through the inlet, and the metal silicon powder has an average particle diameter of 10 microns or less.

6. The method of claim 1, wherein the metal silicon and the tetrachlorosilane are in a weight ratio of 1:20-200.

7. The method of claim 1, wherein the tetrachlorosilane is a by-product in the deposition of polysilicon by the reaction of trichlorosilane with hydrogen.

8. The method of claim 1, wherein the metal silicon powder is used up in the reaction and does not remain after the reaction.

9. The method of claim 1, wherein the reaction is carried out at a pressure in the range of 5 bar to 100 bar.

* * * * *